United States Patent [19]

Fisher et al.

[11] Patent Number: 4,773,438
[45] Date of Patent: Sep. 27, 1988

[54] APPARATUS FOR CONTROLLING THE VISCOSITY OF WIRE COATING ENAMEL

[75] Inventors: James H. Fisher, Kendallville; Victor Sutton, Wolcottville, both of Ind.

[73] Assignee: United Technologies Corporation, Hartford, Conn.

[21] Appl. No.: 80,044

[22] Filed: Jul. 31, 1987

[51] Int. Cl.⁴ ............................................ G05D 24/02
[52] U.S. Cl. ............................................ 137/92
[58] Field of Search .................................. 137/4, 92

[56] References Cited

U.S. PATENT DOCUMENTS 2,208,444  7/1940  Bailey ................................. 137/92
2,590,538  3/1952  Huck .................................. 137/92

*Primary Examiner*—Robert G. Nilson
*Attorney, Agent, or Firm*—Harry J. Gwinnell

[57] ABSTRACT

An apparatus for controlling the flow of a diluent to adjust the viscosity of a magnet wire coating enamel solution is disclosed. The apparatus comprises a flow loop, a pressure sensor, a proportional controller and a flow control valve.

3 Claims, 1 Drawing Sheet

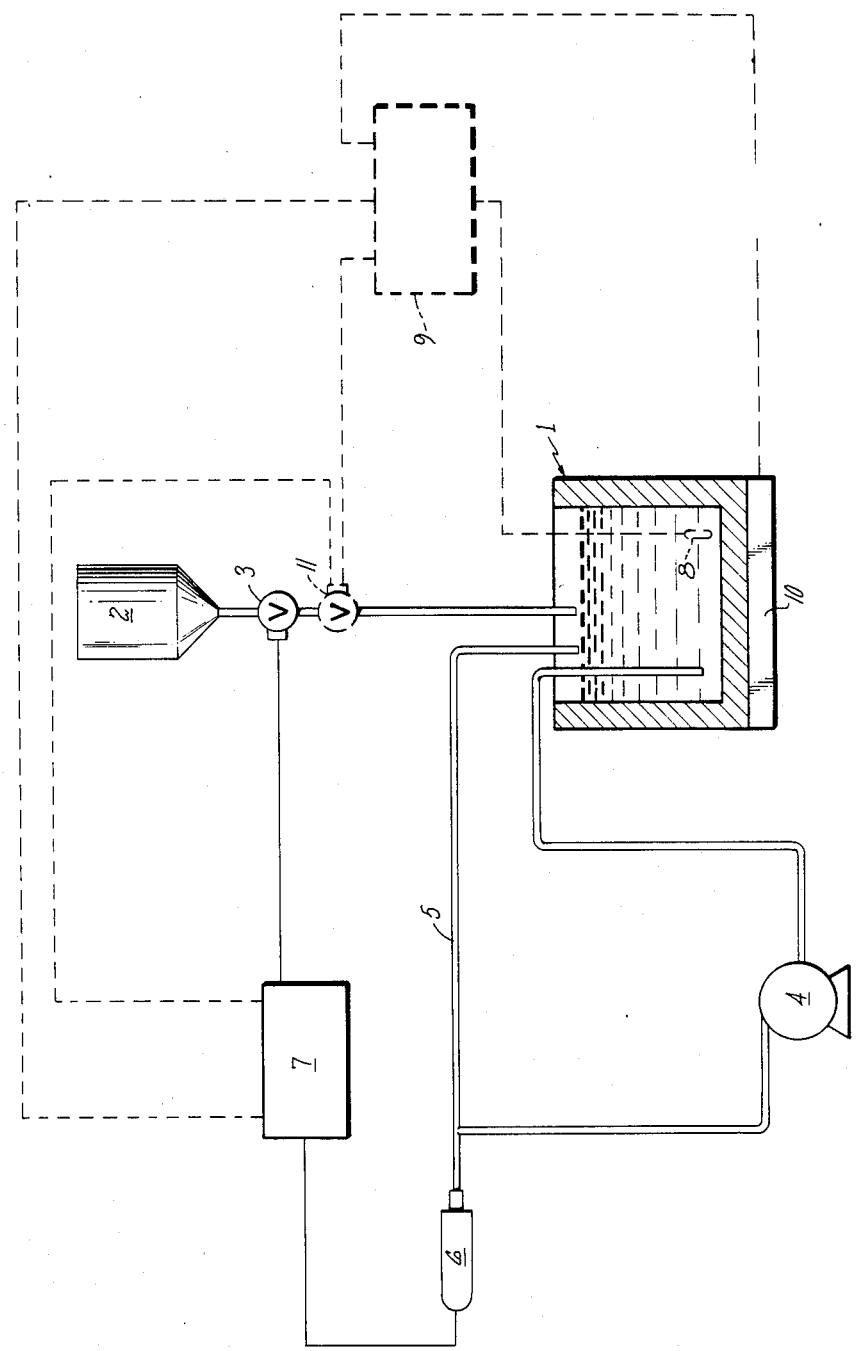

APPARATUS FOR CONTROLLING THE VISCOSITY OF WIRE COATING ENAMEL

DESCRIPTION

TECHNICAL FIELD

The field of art to which this invention pertains is enamel coating for magnet wire.

BACKGROUND OF THE INVENTION

Magnet wire is manufactured by applying a coating of enamel to a filament of copper or aluminum conductor. Typically, the conductor is passed through a bath of liquid enamel or a solution of enamel in a solvent and then heated in an oven to drive off the solvent and to cure the enamel. Coating thickness is an important design parameter and it is very important to control the thickness of the coating within a predetermined range. The coating thickness is strongly dependent upon the viscosity of the liquid enamel or enamel solution and the viscosity of the enamel must be carefully controlled in order to provide a uniform coating thickness. Conventional methods of controlling the viscosity of the enamel coating have proven inadequate in that wide variation in enamel viscosity is permitted and wire coatings are allowed to vary out of the predetermined specification range. When the coating thickness drifts out of specification, the production line must be shut down, the problem corrected, and the defective product scrapped.

What is needed in this art is an apparatus for closely controlling the viscosity of wire coating enamel.

DISCLOSURE OF THE INVENTION

An apparatus for controlling the viscosity of a wire coating enamel is disclosed.

The foregoing and other features and advantages of the present invention will become more apparent from the following description and accompanying drawings.

BRIEF DESCRIPTION OF THE DRAWINGS

The Figure is a schematic diagram of the apparatus of the present invention.

BEST MODE FOR CARRYING OUT THE INVENTION

The enamel tank (1) may be any vessel with suitable chemical and temperature resistance. Wire coating enamels include polyurethane resins, polyester resins, polyamide-imide resins and are conventional in the art. Of particular interest are enamel coatings for fine gauge magnet wire which typically comprise about 25 wt% to 35 wt% resin and 65 wt% to 75 wt% diluent and have a viscosity in the range of about 20cp to about 50cp at about 120° F. The tank (1) is preferably constructed of stainless steel and is preferably provided with a water-filled outer jacket for control of the temperature of the enamel. Such tanks are commercially available.

The diluent tank (2) may be any vessel in which a suitable quantity of diluent may be stored which is compatible with the diluent. The diluent typically comprises a mixture of phenol, cresol and xylene. The diluent tank (2) is preferably constructed of stainless steel and is enclosed to contain diluent vapors and pressurized to provide a driving force for transfer of diluent to the enamel tank.

The pump means (4) of the present invention may comprise any pump compatible with the enamel solution which will provide a constant volumetric output with a minimum of pulsing and having low slip. A gear pump is preferred. Such pumps are commercially available, for example, a Viking C-32 gear pump, manufactured by Viking Pump Division of Houdaille Industries of Cedar Falls, Iowa.

The capillary tube (5) for returning enamel from the pump to the enamel tank may be of any material compatible with the enamel and is of a selected diameter chosen such that the enamel returns to the enamel tank under conditions of laminar flow. The capillary diameter may be selected by calculating a Reynolds number for the viscosity range of interest and the flow rate of the pump, where the Reynolds number is given by the equation $Re = Lv\,p/u$, where $Re$ = Reynolds number
$D$ = tubing diameter
$v$ = enamel velocity
$p$ = enamel density and
$u$ = enamel viscosity.

The flow is laminar if the value of the Reynolds number is less than about 2100.

A pressure sensor (6) measures the pump outlet pressure. The differential between the pump outlet pressure and the capillary outlet pressure is directly proportional to the viscosity of the enamel, given a capillary of constant radius and length and a constant volumetric flow rate. This result is described by the Hagen-Poiseuille law $Q = \Delta p \pi R^4 / 8uL$, where $Q$ = mass flow rate of enamel
$\Delta P$ = pressure difference between pump outlet and capilary outlet
$R$ = tubing radius
$L$ = tubing length and
$u$ = enamel viscosity The Hagen-Poiseuille law assumes that there is a steady state laminar flow of a Newtonian fluid of constant density in which the fluid behaves as a continuum and there is no slip at the capillary wall. The Hagen-Poiseuille law neglects end effects which are not substantial if a length of the capillary greatly exceeds an entrance length given by $Le = 0.035 D Re$, where
$Le$ = entrance length
$D$ = tubing diameter
$Re$ = Reynolds number, output from the pressure sensing means is directed to a viscosity controller.

The control means (7) may be any time-proportional controller having an input range which matches the output range of the pressure sensor. A microprocessor based time proportional control is preferred; a microprocessor based control which allows a scaled readout is particularly preferred. A control having a scaled readout allows the viscosity of the enamel to be read directly in selected unit. Suitable time proportional controllers include, for example, the LFE4500, manufactured by LFE Industries in Clinton, Massachusetts, the Partlow MIC2000, manufactured by Partlow Corporation of New Hartford, New York, or the Love300, manufactured by Love Controls Corporation of Wheeling, Illinois.

The control means (7) is responsive to the signal from the pressure sensing means (6). The control means includes a memory means for storing a reference signal indicative of a reference fluid pressure and a signal processor for comparing the signal from the pressure sensing means (6) to the reference signal to determine the difference between the signals and an actuator means which provides a primary control signal to open and close the valve (3). The valve is opened for an open time interval and closed for a closed time interval. The ratio of the duration of the open time interval to the closed time interval is controlled to be proportional to the to the magnitude of the difference between the signal from the pressure sensor (6) and the reference signal, if the pressure in the capillary is higher than the reference pressure.

The control means (7) may provide a secondary control signal to the valve (11). Valve (II) remains closed until the pressure sensor signal exceeds a preset minimum to avoid overdilution of the enamel if, for example, the temperature of the enamel is not within the proper range.

The valves (3) and (11) may be any solenoid valves of suitable size and material of construction compatible with the enamel and diluent. A ⅜ inch stainless solenoid valve having Teflon® seals (DuPont) known as an Asco 8263832 solenoid valve, manufactured by Automatic Switch Company, was found to be suitable for use with the present invention.

The temperature sensor (8) may be any thermocouple suitable for the temperature range of interest and compatible with the enamel. A suitable thermocouple is, for example, a chrome-alumel thermocouple in a stainless steel sheath manufactured by Pyromation Incorporated, of Fort Wayne, Ind. The temperature sensor (8) provides a signal indicative of the temperature of the enamel to the temperature control means (9).

The temperature control means (9) may be any time-proportional controller having an input range which matches the output range of the temperature sensor (8). The temperature control means includes a memory means for storing a reference signal indicative of a reference temperature, a signal processor for comparing the signal from the temperature sensor (8) to the reference signal to determine the difference between the signals, and an actuator means which provides a primary control signal to the heater means (10). If the difference between the signal from the temperature sensor (8) and the reference signal indicates that the enamel temperature is lower than the reference temperature, the actuator means provides a signal to activate the heater means (10) to heat the enamel. Suitable control means are commercially available and include the examples discussed above in regard to control means (7).

The heater means (10) may be any conventional heater means such as an immersion heater in a water jacket surrounding the tank of enamel, or a heat exchanger included in the enamel flow loop.

The control means (9) may provide a secondary control signal to the valve (11) to insure that the valve remains closed until the temperature sensor signal exceeds a preset minimum to avoid overdilution of the resin, if the temperature is below the desired operating range.

EXAMPLE

A polyurethane enamel comprising about 30 wt % solids and about 70 wt% xylene/phenol/cresol diluent is heated to 115° F. in a stainless steel tank with water jacket. The temperature is controlled by sensing the temperature of the enamel with a thermocouple immersed in the enamel. The thermocouple provides a signal to the temperature controller which provides a signal to turn on heater immersed in the water jacket of the enamel tank.

A stream of enamel is pumped from the enamel tank with a gear pump at a constant volumetric flow rate and returned to the enamel tank through a capillary tube. The pressure of the enamel in the capillary tube is sensed with a pressure sensor. The pressure sensor provides an output signal indicative of the enamel pressure to the viscosity controller. The viscosity controller compares the valve of the pressure sensor signal to a reference signal indicative of a reference enamel pressure. If the signal from the sensor exceeds the reference signal to indicate an enamel pressure higher than the reference pressure, the controller provides a signal to open the valve between the diluent tank and the enamel tank. The valve closes every 30 seconds and the duration of the open period is proportional to the magnitude of the difference between the sensor signal and the reference signal. When the valve is open, diluent flows from the diluent tank to the enamel tank to lower the viscosity of the enamel.

The apparatus and process of the present invention provides precise control of the viscosity of magnet wire enamel.

Although this invention has been shown and described with respect to detailed embodiments thereof, it will be understood by those skilled in the art that various changes in form and detail thereof may be made without departing from the spirit and scope of the claimed invention

I claim:

1. An apparatus for controlling a flow of a diluent to a viscous enamel to control the viscosity of the enamel in a system having an enamel tank for containing the enamel, a diluent reservoir for containing the diluent and a valve for metering the flow of diluent into the enamel tank, comprising:

an enamel flow loop having a pump means for pumping enamel from the enamel tank at a constant volumetric flow rate and a capillary tube for returning a flow of the enamel to the enamel tank under laminar flow conditions, a pressure sensing means, responsive to the flow of enamel, for providing sensed signals indicative of pressure in the capillary tube, a control means, responsive to the sensed signals, including a memory means for storing a reference signal indicative of a reference pressure, a signal processor means for comparing the sensed signal to the reference signal to determine the difference between the signals and an actuator means for providing a control signal to open the valve for an open time period and close the valve for a closed time period, as characterized by a relative duration of the open time period to the closed time period which is proportional to the magnitude of the difference between the sensed signal and the reference signal, if the enamel pressure is higher than the reference pressure.

2. The apparatus of claim 1 additionally comprising:

a temperature control system having a temperature sensor means, responsive to the temperature of the enamel and providing a signal indicative of the temperature of the enamel, a second controller means, responsive to the signals from the temperature sensor, and providing a signal to activate a heater mean to heat the enamel.

3. The apparatus of claim 2 additionally comprising a second flow control valve wherein the first controller provides a secondary signal to the second valve to cause the valve to close if the signal from the pressure sensor is below a preset minimum value and the second controller provides a secondary signal to the second valve to cause the valve to close if the signal from the temperature sensor is below a preset minimum value.

* * * * *

UNITED STATES PATENT AND TRADEMARK OFFICE
CERTIFICATE OF CORRECTION

PATENT NO. : 4,773,438

DATED : September 27, 1988

INVENTOR(S) : James H. Fisher and Victor Sutton

It is certified that error appears in the above-identified patent and that said Letters Patent is hereby corrected as shown below:

Title page:

"Assignee: United Technologies Corporation, Hartford, Conn." should be

--Assignee: Essex Group, Inc., Fort Wayne, IN--

Column 2, line 46 "," should be --.--

Column 2, line 47 "output" should be --Output--

Column 4, line 68 "mean" should be --means--

Signed and Sealed this

Twenty-first Day of February, 1989

Attest:

DONALD J. QUIGG

*Attesting Officer*     *Commissioner of Patents and Trademarks*